(12) United States Patent
Lee et al.

(10) Patent No.: US 9,813,838 B2
(45) Date of Patent: Nov. 7, 2017

(54) APPARATUS AND METHOD FOR SUPPORTING QOS SERVICE OF APPLICATION IN WIRELESS COMMUNICATION SYSTEM

(75) Inventors: Ji-Cheol Lee, Suwon-si (KR); Sung-Ho Choi, Suwon-si (KR); Beom-Sik Bae, Suwon-si (KR); Jung-Shin Park, Seoul (KR); Song-Yean Cho, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 13/352,125

(22) Filed: Jan. 17, 2012

(65) Prior Publication Data

US 2012/0184259 A1    Jul. 19, 2012

(30) Foreign Application Priority Data

Jan. 17, 2011   (KR) ........................ 10-2011-0004457

(51) Int. Cl.
| | | |
|---|---|---|
| *H04W 4/00* | (2009.01) | |
| *H04L 12/24* | (2006.01) | |
| *H04L 12/851* | (2013.01) | |
| *H04L 12/801* | (2013.01) | |
| *H04L 29/06* | (2006.01) | |

(52) U.S. Cl.
CPC ........ *H04W 4/001* (2013.01); *H04L 41/5019* (2013.01); *H04L 47/14* (2013.01); *H04L 47/2425* (2013.01); *H04L 65/1006* (2013.01); *H04L 65/1069* (2013.01); *H04L 65/80* (2013.01); *H04L 69/24* (2013.01); *H04L 47/2408* (2013.01); *H04L 47/2441* (2013.01); *H04L 65/00* (2013.01)

(58) Field of Classification Search
CPC ............. H04W 2/02688; H04W 28/16; H04W 2/0268; H04W 28/24
USPC .................................. 455/418, 452.2, 456.2
See application file for complete search history.

(56) References Cited

U.S. PATENT DOCUMENTS

| | | | |
|---|---|---|---|
| 6,910,074 B1* | 6/2005 | Amin et al. ................... | 709/227 |
| 2004/0022191 A1* | 2/2004 | Bernet ................ | H04L 12/5695 370/230 |
| 2005/0078638 A1* | 4/2005 | Xue et al. ...................... | 370/335 |
| 2005/0128963 A1* | 6/2005 | Gazda et al. .................. | 370/278 |
| 2005/0157660 A1* | 7/2005 | Mandato ............. | H04L 12/5695 370/254 |
| 2006/0002377 A1* | 1/2006 | Skog et al. .................... | 370/352 |
| 2006/0114855 A1* | 6/2006 | Zheng ........................... | 370/331 |
| 2007/0189293 A1* | 8/2007 | Yamada et al. ............... | 370/392 |
| 2007/0223421 A1* | 9/2007 | Zafer et al. ................... | 370/331 |
| 2008/0025218 A1* | 1/2008 | Liu ................................ | 370/235 |
| 2008/0082990 A1* | 4/2008 | Kong et al. ................... | 719/318 |
| 2008/0132269 A1* | 6/2008 | Shen et al. ................. | 455/550.1 |
| 2009/0055905 A1* | 2/2009 | Graveline et al. ................. | 726/4 |
| 2009/0175294 A1* | 7/2009 | Orr et al. ...................... | 370/463 |

(Continued)

*Primary Examiner* — Qun Shen (57) ABSTRACT

A method and a system are capable of supporting a Quality of Service (QoS) service in a wireless communication system. The method for supporting the QoS service includes checking a service capability of an application; when the application provides a QoS service, requesting QoS configuration to a QoS server; and when receiving a QoS configuration response signal from the QoS server, checking whether QoS of the application is allocated, in the QoS configuration response signal.

18 Claims, 7 Drawing Sheets

(56) References Cited

U.S. PATENT DOCUMENTS

2010/0115072 A1* 5/2010 Payyappilly ............ H04L 47/10
                                                    709/222
2011/0066563 A1* 3/2011 Jagadeesan et al. .......... 705/317
2011/0208853 A1* 8/2011 Castro-Castro ......... H04L 12/14
                                                    709/223

* cited by examiner

APPARATUS AND METHOD FOR SUPPORTING QOS SERVICE OF APPLICATION IN WIRELESS COMMUNICATION SYSTEM

CROSS-REFERENCE TO RELATED APPLICATION(S) AND CLAIM OF PRIORITY

The present application is related to and claims priority under 35 U.S.C. §119(a) to a Korean patent application filed in the Korean Intellectual Property Office on Jan. 17, 2011, and assigned Serial No. 10-2011-0004457, the entire disclosure of which is hereby incorporated by reference.

TECHNICAL FIELD OF THE INVENTION

The present invention relates generally to a wireless communication system.

BACKGROUND OF THE INVENTION

Recently, as the supply of mobile communication terminals increases, mobile communication terminals having various designs, functions, and efficiencies are released to satisfy diverse demands of users. In addition, smart phones that graft a portable phone for the communication function onto a Personal Digital Assistant (PDA) for the computing function are supplied rapidly.

The smart phone supports a portable computer function, an electronic note function, an Internet search function, and so forth. As the supply of the smart phones sharply increases, a large number of programs for the smart phone are under development.

When the smart phone supports a Quality of Service (QoS) service, a communication carrier and a service provider of the smart phone need to make an agreement to support the QoS service for the corresponding application. Herein, the service provider includes an Internet Protocol (IP) Multimedia Subsystem (IMS).

As discussed above, to support the QoS service of the application in the smart phone, the communication carrier and the service provider should make an agreement to provide the QoS service per application. In addition, applications for open Application Programming Interface (API) of the smart phone are developed actively. Hence, what is needed is a method for receiving the QoS service per application separately from the service provider.

SUMMARY OF THE INVENTION

To address the above-discussed deficiencies of the prior art, it is a primary aspect of the present disclosure to provide an apparatus and a method for supporting a Quality of Service (QoS) service of an application in a wireless communication system.

Another aspect of the present disclosure is to provide an apparatus and a method of a mobile station for requesting QoS of an application in a wireless communication system.

Yet another aspect of the present disclosure is to provide an apparatus and a method of a QoS Mashup Agent (QMA) of a mobile station for requesting a QoS service of a corresponding application to a QoS Mashup Server (QMS) of a communication carrier in a wireless communication system.

Still another aspect of the present disclosure is to provide an apparatus and a method of a QMA of a mobile station for requesting a QoS service of a corresponding application to a QMS of a service provider in a wireless communication system.

According to one aspect of the present disclosure, a method for providing a QoS service in a mobile station of a wireless communication system, includes checking a service capability of an application; when the application provides a QoS service, requesting QoS configuration to a QoS server; and when receiving a QoS configuration response signal from the QoS server, checking whether QoS of the application is allocated, in the QoS configuration response signal.

According to another aspect of the present disclosure, a method for providing a QoS service of a mobile station in a QoS server of a wireless communication system includes when the mobile station requests QoS configuration for an application, determining whether to accept the QoS configuration request of the application; and when accepting the QoS configuration request of the application, transmitting QoS configuration information to the mobile station.

According to yet another aspect of the present disclosure, an apparatus for providing a QoS service in a mobile station of a wireless communication system includes an application layer that can check a service capability of an application; and a QoS configuration module that can, when the application provides a QoS service, request QoS configuration to a QoS server, and in response to receiving a QoS configuration response signal from the QoS server, check whether QoS of the application is allocated, in the QoS configuration response signal.

According to still another aspect of the present disclosure, an apparatus for providing a QoS service of a mobile station in a QoS server of a wireless communication system includes a communication interface; a QoS configurator that, when the mobile station requests QoS configuration for an application, determines whether to accept the QoS configuration request of the application; and a controller that, when accepting the QoS configuration request of the application, transmits QoS configuration information to the mobile station.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain exemplary embodiments of the present disclosure will be more apparent from the following description taken in conjunction with the accompanying drawings, in which.

Throughout the drawings, like reference numerals will be understood to refer to like parts, components and structures.

DETAILED DESCRIPTION OF THE INVENTION

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system. Embodiments of the present disclosure will be described herein below with reference to the accompanying drawings. In the following description, well-known functions or constructions are not described in detail since they would obscure the invention in unnecessary detail. Terms described below, which are defined considering functions in the present invention, can be different depending on user and operator's intention or practice. Therefore, the terms should be defined on the basis of the disclosure throughout this specification.

It is to be understood that the singular forms "a," "an," and "the" include plural referents unless the context clearly dictates otherwise. Thus, for example, reference to "a component surface" includes reference to one or more of such surfaces.

The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present disclosure provide a technique for supporting a Quality of Service (QoS) service for an application in a mobile station of a wireless communication system.

Hereinafter, it is assumed that the mobile station includes a portable terminal supporting applications.

Figure 1:
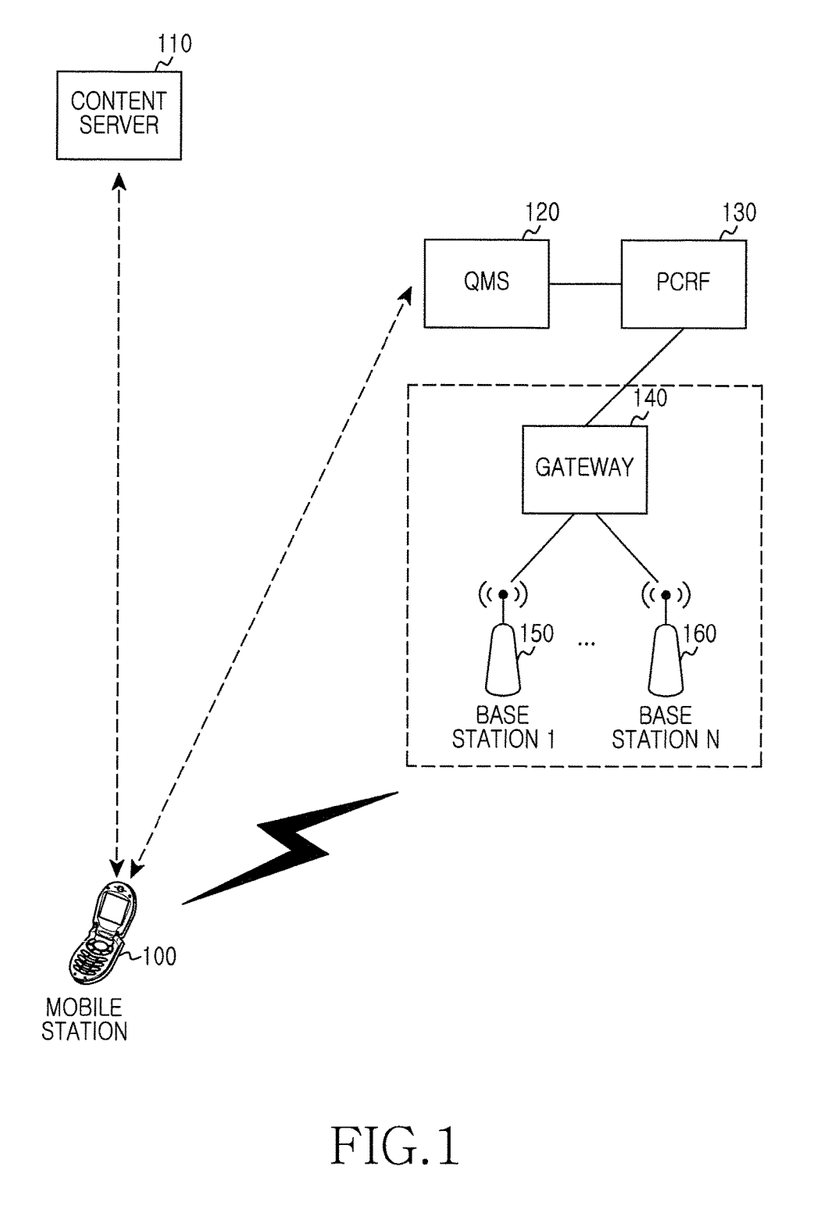
FIG. 1 illustrates a wireless communication system according to an exemplary embodiment of the present disclosure.

FIG. 1 illustrates a wireless communication system according to an exemplary embodiment of the present disclosure.

As shown in FIG. 1, the wireless communication system includes a mobile station 100, a content server 110, a QoS Mashup Server (QMS) 120, a Policy and Charging Rule Function (PCRF) 130, a GateWay (GW) 140, and base stations 150 and 160. Herein, the GW 140 is assumed to include a Policy and Charging Enforcement Function (PCEF).

The mobile station 100 provides a communication service through a communication carrier and a service for various contents received from the content server 110. To support the QoS service of the content, the mobile station 100 requests the QoS of the corresponding service to the QMS 120 using a QoS Mashup Agent (QMA).

The QMS 120 controls the QoS service of mobile stations. That is, the QMS 120 determines whether to accept the QoS request of the mobile station 100. For example, the QMS 120 determines whether to accept the QoS request of the mobile station 100, by considering a Subscription IDentifier (SID), an application ID, a destination address, and application service information received from the mobile station 100.

When accepting the QoS request of the mobile station 100, the QMS 120 performs a Internet Protocol (IP)-Connectivity Access Network (CAN) session modification procedure as a new QoS service is added. For example, when accepting the QoS request of the mobile station 100, the QMS 120 sends a diameter Authentication Accounting Request (AAR) message to the PCRF 130 for the IP-CAN session modification procedure.

The PCRF 130 generates a Policy and Charging Control (PCC) rule for the QoS and the charging. Upon receiving the diameter AAR message from the QMS 120, the PCRF 130 operates to modify the IP-CAN session. For example, upon receiving the diameter AAR message from the QMS 120, the PCRF 130 sends a diameter Re-Auth Request (RAR) message to the GW 140. Herein, the PCC rule indicates a control rule including the QoS and charging rule information.

When the QoS service is provided as above, the mobile station 100 requests the QoS to the QMS 120. To request the QoS, the mobile station 100 is constructed as shown in FIG. 2.

Figure 2:
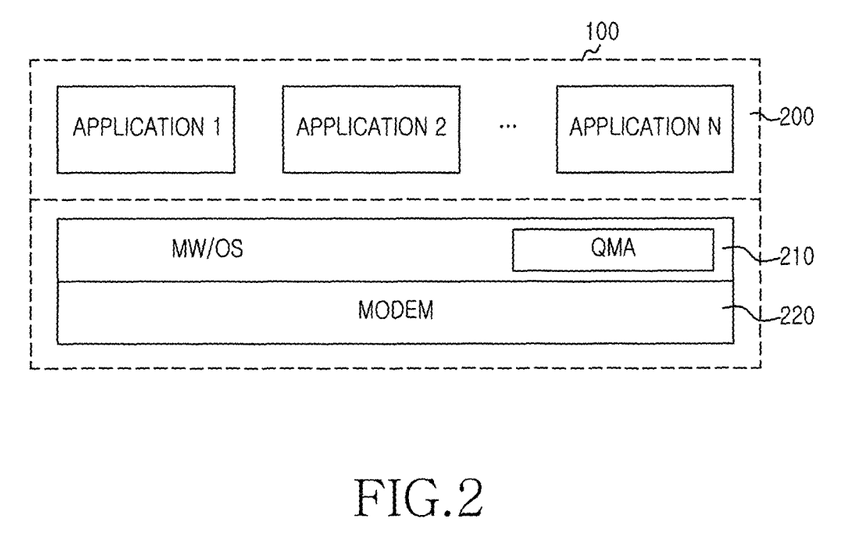
FIG. 2 illustrates a mobile station according to an exemplary embodiment of the present disclosure.

FIG. 2 illustrates a mobile station according to an exemplary embodiment of the present disclosure.

As shown in FIG. 2, the mobile station 100 includes an application layer 200, a QoS configuration module 210, and a modem 220.

Figure 3:
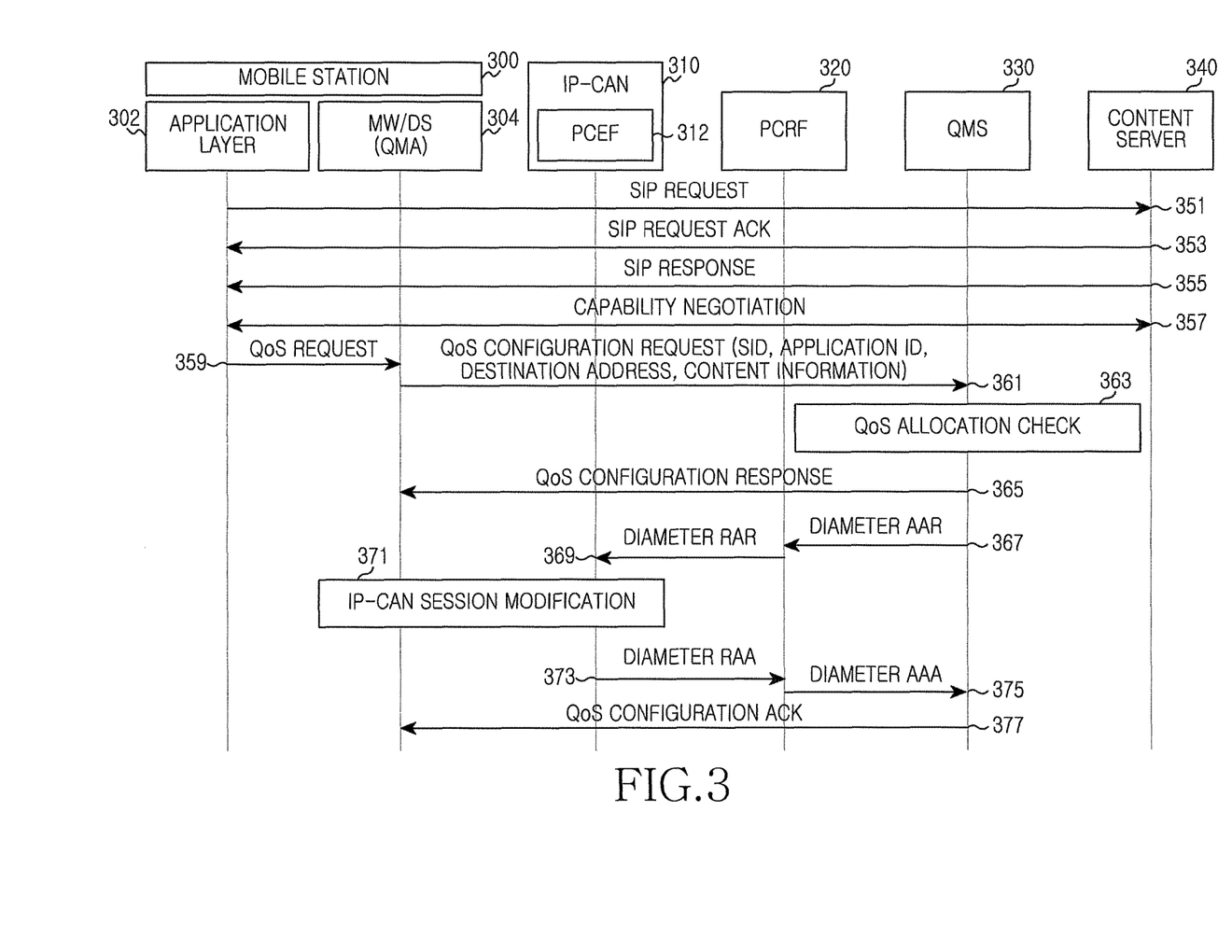
FIG. 3 illustrates a method for setting QoS of an application in the wireless communication system according to an exemplary embodiment of the present disclosure.
Figure 4:
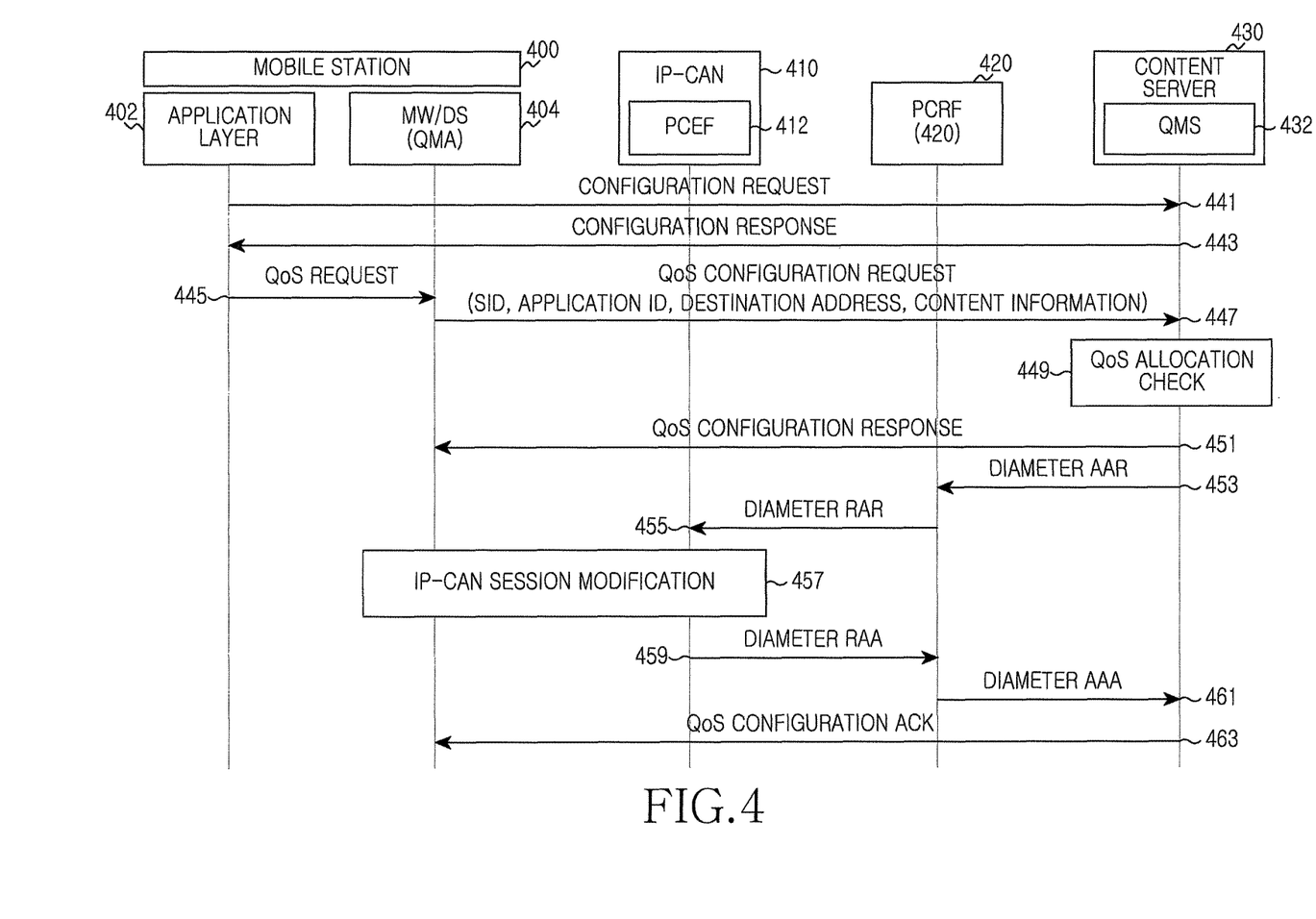
FIG. 4 illustrates a method for setting the QoS of the application in the wireless communication system according to another exemplary embodiment of the present disclosure.

The application layer 200 includes information of the application received from the content server 110 and installed by the mobile station 100. The application layer 200 receives the information of the application to install from the content server 110. For example, the application layer 200 negotiates with a content server 340 for the application information as shown in FIG. 3. For example, the application layer 200 can receive the application information from a content server 430 as shown in FIG. 4.

The QoS configuration module 210 includes the QMA. When a particular application of the applications in the application layer 200 requests the QoS service, the QMA requests the QoS configuration for the corresponding application to the QMS 120. Herein, the QoS configuration module 210 includes MiddleWare (MW)/Operating System (OS).

The modem 220, which is hardware of the mobile station 100, processes signals transmitted and received over a wireless network.

As above, the mobile station 100 directly requests the QoS of the application to the QMS 120 using the QMA of the QoS configuration module 210. When the QMS 120 is included in the communication carrier which offers the communication service, the mobile station 100 requests the QoS configuration as shown in FIG. 3. Hereafter, it is assumed that the mobile station 100 installs the application. Yet, the mobile station 100 can equally configure the QoS when attempting the communication with another mobile station 100.

FIG. 3 illustrates a method for setting the QoS of the application in the wireless communication system according to an exemplary embodiment of the present disclosure.

In FIG. 3, when a mobile station 300 intends to install the application, the mobile station 300 sends a Session Initiation Protocol (SIP) request message for the application to install, to a content server 340 in step 351.

Receiving the SIP request message from the mobile station 300, the content server 340 sends an SIP request ACK message to the mobile station 300 in step 353.

According to the SIP request message of the mobile station 300, the content server 340 sends an SIP response message including information of the application to install to the mobile station 300, to the mobile station 300 in step 355. Herein, the application information includes a name, a transmission address, connection information, and band information required for the service of the application program.

After confirming the application information in the SIP response message, the mobile station 300 determines a necessary capacity for the service using the application by negotiating with the content server 340 in step 357.

When the application received from the content server 340 and installed by the mobile station 300 provides the QoS service according to the capacity negotiation result of the application, the corresponding application installed to an application layer 302 of the mobile station 300 requests the QoS to a QoS configuration module 304 in step 359. In so doing, the QoS configuration module 304 can include the MW/OS. For example, the application requests the QoS to the QMA of the MW/OS 304 through a MW Application Program Interface (API). Herein, as requesting the QoS, the application layer 302 of the mobile station 300 also transmits a Session ID (SID), an application ID, a destination address, and application service information. The application service information includes a required bit rate of the application, a maximum bit rate, an Allocation and Retention Priority (ARP), an optional QoS Class ID (QCI) value, and QoS information required to provide the service. The SID and the application ID can be obtained when the application is installed. The application ID includes at least one of an application ID and an OS ID.

The QoS configuration module 304 sends the QoS configuration request message to the QMS 330 via the QMA in step 361. Herein, the QoS configuration request message includes the SID, the application ID, the destination address, and the application service information.

According to the QoS configuration request, the QMS 330 determines whether to accept the QoS configuration request of the mobile station 300 in step 363. For example, the QMS 330 determines whether to accept the QoS request of the mobile station 300 by taking account of the SID, the application ID, the destination address, and the application service information received from the QoS configuration module 304. Herein, the QMS 330 can be implemented together with a Policy Authorization Server (PAS).

Next, the QMS 330 sends the QoS configuration response message including the determination information to the QoS configuration module 304 in step 365.

When the QMS 330 accepts the QoS request of the mobile station 300, the QMS 330 performs the IP-CAN session modification procedure as the new QoS service is added. For example, when accepting the QoS request of the mobile station 300, the QMS 330 sends the diameter AAR message to the PCRF 320 for the IP-CAN session modification procedure in step 367.

Upon receiving the diameter AAR message, the PCRF 320 sends the diameter RAR message to an IP-CAN 310 in step 369. For example, the PCRF 320 sends the diameter RAR message to a PCEF 312 of the IP-CAN 310. In so doing, the PCRF 320 authenticates the service information in the AAR message and determines the PCC rule including the QoS of the corresponding service.

Receiving the diameter RAR message, the IP-CAN 310 modifies the session with the mobile station 300 in step 371. For example, the IP-CAN 310 modifies the session with the modem of the mobile station 300.

When completing the session modification, the IP-CAN 310 sends a diameter Re-Auth Answer (RAA) message to the PCRF 320 in step 373. For example, upon completing the session modification, the PCEF 312 of the IP-CAN 310 sends the diameter RAA message to the PCRF 320.

Receiving the diameter RAA message, the PCRF 320 sends a diameter Authentication, Authorization, Accounting (AAA) message to the QMS 330 in step 375.

The QMS 330, receiving the diameter AAA message, recognizes that the IP-CAN session modification is completed. Hence, the QMS 330 sends the QoS configuration ACK message to the QoS configuration module 304 of the mobile station 300 so as to inform the IP-CAN session modification completion in step 377.

When receiving the QoS ACK message, the QoS configuration module 304 changes an internal status of the activated QoS bearer. Thus, the mobile station 300 can transmit traffic of the application through the required QoS bearer.

In this embodiment, the QMS 120 is included in the communication carrier.

Alternatively, when the QMS 120 is included in the service provider which provides the application, the mobile station 100 requests the QoS configuration as shown in FIG. 4.

FIG. 4 illustrates a method for setting the QoS of the application in the wireless communication system according to another exemplary embodiment of the present disclosure.

In FIG. 4, when a mobile station 400 intends to install the application, the mobile station 400 sends a configuration request message for the application to install, to a content server 430 in step 441. Herein, the configuration request message includes at least one of a Uniform Resource Locator (URL) including the transmission scheme of the application, a protocol, a URL version, a sequence number, a transmission protocol, and a port address.

In response to the configuration request message received from the mobile station 400, the content server 430 sends a configuration response message including the information of the application to install to the mobile station 400, to the mobile station 400 in step 443. Herein, the configuration response message includes at least one of a sequence number of the mobile station 400, the time, a session number allocated, the transmission protocol, and a port number of the server.

When the application provided from the content server 430 and installed by the mobile station 400 provides the QoS service according to the configuration response message, the corresponding application installed to an application layer 402 of the mobile station 400 requests the QoS to a QoS configuration module 404 in step 445. At this time, the QoS configuration module 404 can include the MW/OS. For example, the application requests the QoS to the QMA of the MW/OS 404 through a MW API. Herein, as requesting the QoS, the application layer 402 of the mobile station 400 also transmits the SID, the application ID, the destination address, and the application service information. The application service information includes the required bit rate of the application, the maximum bit rate, the ARP, the optional QCI value, and the QoS information required to provide the service. The SID and the application ID can be obtained when the application is installed. The application ID includes at least one of the application ID and the OS ID.

The QoS configuration module 404 sends the QoS configuration request message to a QMS 432 of the content server 430 via the QMA in step 447. Herein, the QoS configuration request message includes the SID, the application ID, the destination address, and the application service information.

According to the QoS configuration request, the QMS 432 determines whether to accept the QoS configuration request of the mobile station 400 in step 449. For example, the QMS 432 determines whether to accept the QoS request of the mobile station 400 by taking account of the SID, the application ID, the destination address, and the application service information received from the QoS configuration module 404. Herein, the QMS 432 can be implemented together with the PAS.

Next, the QMS 432 sends the QoS configuration response message including the determination information to the QoS configuration module 404 in step 451.

When the QMS 432 accepts the QoS request of the mobile station 400, the QMS 432 performs the IP-CAN session modification procedure as the new QoS service is added. For example, when accepting the QoS request of the mobile station 400, the QMS 432 sends the diameter AAR message to the PCRF 420 for the IP-CAN session modification procedure in step 453. At this time, the QMS 432 is placed in the service provider, not in the communication carrier. Accordingly, it is assumed that the communication carrier including the PCRF 420 and the content server 430 make the agreement for the QoS service.

Upon receiving the diameter AAR message, the PCRF 420 sends the diameter RAR message to an IP-CAN 410 in step 455. For example, the PCRF 420 sends the diameter RAR message to a PCEF 412 of the IP-CAN 410. In so doing, the PCRF 420 authenticates the service information in the AAR message and determines the PCC rule including the QoS of the corresponding service.

Receiving the diameter RAR message, the IP-CAN 410 modifies the session with the mobile station 400 in step 457. For example, the IP-CAN 410 modifies the session with the modem of the mobile station 400.

When completing the session modification, the IP-CAN 410 sends a diameter RAA message to the PCRF 420 in step 459. For example, upon completing the session modification, the PCEF 412 of the IP-CAN 410 sends the diameter RAA message to the PCRF 420.

Receiving the diameter RAA message, the PCRF 420 sends the diameter AAA message to the QMS 432 in step 461.

The QMS 432, upon receiving the diameter AAA message, recognizes that the IP-CAN session modification is completed. Hence, the QMS 432 sends the QoS configuration ACK message to the QoS configuration module 404 of the mobile station 400 so as to inform the IP-CAN session modification completion in step 463.

When receiving the QoS ACK message, the QoS configuration module 404 changes the internal status of the activated QoS bearer. Thus, the mobile station 400 can transmit the traffic of the application through the required QoS bearer.

Now, an operation method of the mobile station for setting the QoS of the application is explained.

Figure 5:
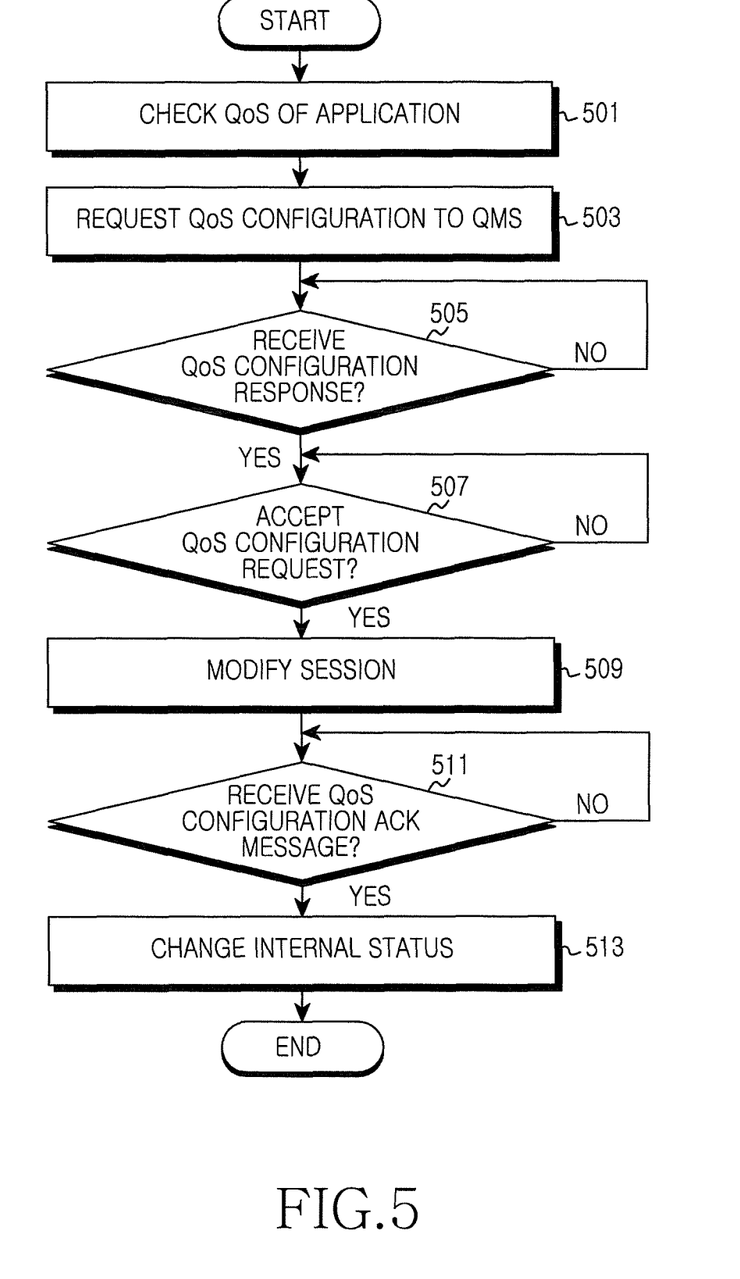
FIG. 5 illustrates a method of the mobile station for setting the QoS of the application in the wireless communication system according to an exemplary embodiment of the present disclosure.

FIG. 5 illustrates a method of the mobile station for setting the QoS of the application in the wireless communication system according to an exemplary embodiment of the present disclosure.

In step 501, the mobile station checks the QoS of the installed application. For example, the mobile station sends the SIP request message for the installed application to the content server as shown in FIG. 3. Next, when receiving the SIP response message from the content server, the mobile station confirms the QoS required for the application installed by the mobile station to provide the service by negotiating with the content server about the capability. For example, the mobile station sends the configuration request message of the installed application to the content server as shown in FIG. 4. Next, when receiving the configuration response message from the content server, the mobile station confirms the QoS required for the application installed by the mobile station to provide the service, in the configuration response message.

In step 503, the mobile station requests the QoS of the application to the QMS. For example, the mobile station sends the QoS configuration request message to the QMS via the QMA of the QoS configuration module. Herein, the QoS configuration request message includes the SID, the application ID, the destination address, and the application service information.

In step 505, the mobile station determines whether the QoS configuration response message is received from the QMS.

When receiving the QoS configuration response message from the QMS, the mobile station determines whether the QMS accepts the QoS configuration request of the mobile station, using the QoS configuration response message in step 507.

When the QMS accepts the QoS configuration request of the mobile station, the mobile station performs the IP-CAN session modification procedure under the control of the QMS in step 509.

In step 511, the mobile station determines whether the QoS configuration ACK message is received from the QMA. For example, the mobile station determines whether the QoS configuration ACK message is received from the QMS via the QMA of the QoS configuration module.

Upon receiving the QoS configuration ACK message from the QMA, the mobile station changes the internal status of the QoS bearer in step 513. Hence, the mobile station can transmit the traffic of the application through the required QoS bearer.

Next, the mobile station finishes this process.

Figure 6:
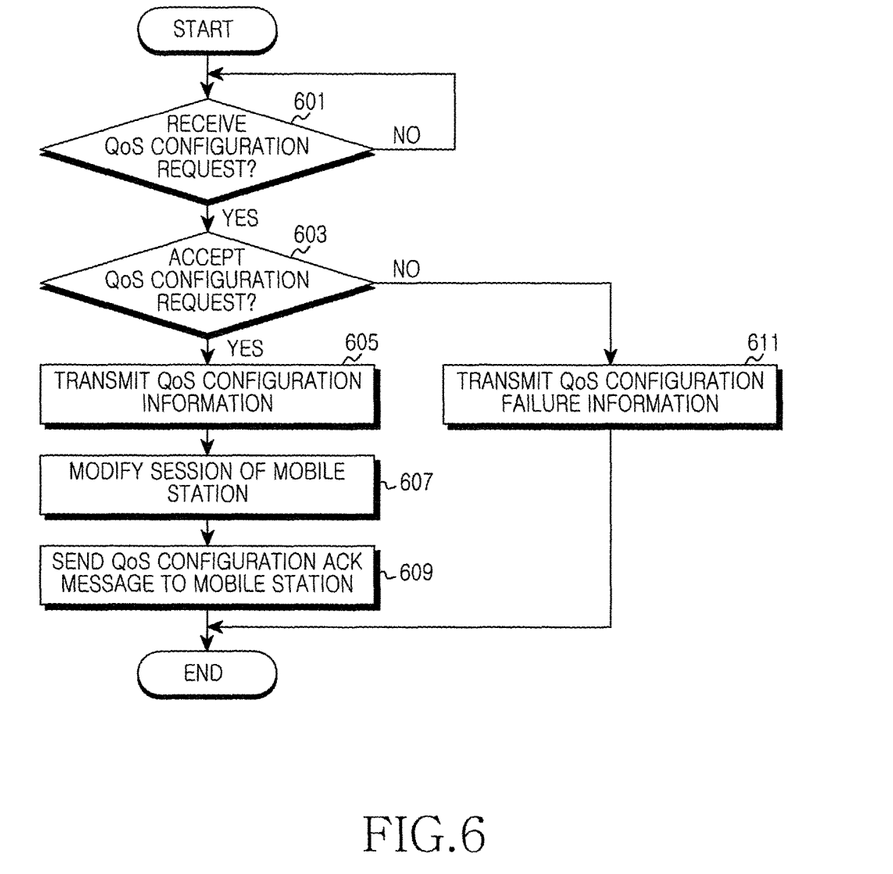
FIG. 6 illustrates a method of a QMS for setting the QoS of the application of the mobile station in the wireless communication system according to an exemplary embodiment of the present disclosure.

The QMS allocates the QoS according to the request of the mobile station as shown in FIG. 6, so that the mobile station can set the QoS as shown in FIG. 5.

FIG. 6 illustrates a method of the QMS for setting the QoS of the application of the mobile station in the wireless communication system according to an exemplary embodiment of the present disclosure.

In step 601, the QMS determines whether the QoS configuration request message is received from the QMA of the mobile station. Herein, the QoS configuration request message includes the SID, the application ID, the destination address, and the application service information. The application program information includes the required bit rate of the application, the maximum bit rate, the ARP, the optional QCI value, and the QoS information required to provide the service. The application ID includes at least one of the application ID and the OS ID.

When receiving the QoS configuration request message from the mobile station, the QMS determines whether to accept the QoS configuration request of the mobile station in step 603. For example, the QMS determines whether to accept the QoS request of the mobile station by considering the SID, the application ID, the destination address, the application service information received from the mobile station.

When accepting the QoS configuration request of the mobile station, the QMS sends the QoS configuration response message including the QoS configuration information to the QMA of the mobile station in step 605.

In step 607, the mobile station performs the IP-CAN session modification procedure as the new QoS service is added. For instance, when accepting the QoS request of the mobile station, the QMS sends the diameter AAR message to the PCRF for the IP-CAN session modification procedure. Next, upon receiving the diameter AAA message from the PCRF, the QMS recognizes that the IP-CAN session modification is completed.

In step 609, the QMS sends the QoS configuration ACK message to the QMA of the mobile station.

By contrast, when not accepting the QoS configuration request of the mobile station in step 603, the QMS sends the QoS configuration response message including QoS configuration failure information to the QMA of the mobile station in step 611.

Next, the QMA finishes this process.

Figure 7:
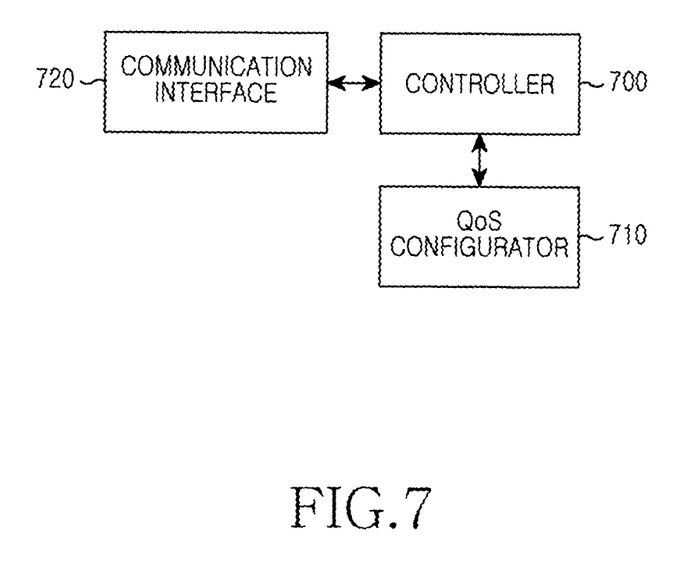
FIG. 7 illustrates the QMS according to an exemplary embodiment of the present disclosure.

Now, a structure of the QMS for allocating the QoS according to the request of the mobile station is depicted.

FIG. 7 illustrates the QMS according to an exemplary embodiment of the present disclosure.

The QMS include a controller 700, a QoS configurator 710, and a communication interface 720 as shown in FIG. 7.

The controller 700 controls the operations of the QMS. For example, when receiving the QoS configuration request message from the QMA of the mobile station, the controller 700 controls the QoS configurator 710 to determine whether to accept the QoS configuration request of the mobile station. When the QoS configurator 710 accepts the QoS configuration request of the mobile station, the controller 700 controls to send the QoS configuration response message including the QoS configuration information to the QMA of the mobile station. As the new QoS service is added, the controller 700 conducts the IP-CAN session modification procedure for the mobile station. For example, when the QMS is included in the content server as shown in FIG. 4, the controller 700 can control to transmit the information of the application to install by the mobile station, to the mobile station according to the request of the mobile station.

The QoS configurator 710 determines whether to accept the QoS configuration request of the mobile station, under the control of the controller 700. For example, the controller 700 determines whether to accept the QoS request of the mobile station, by considering the SID, the application ID, the destination address, and the application service information in the QoS configuration request message received from the mobile station.

The communication interface 720 sends and receives signals to and from the QMA of the mobile station. For example, when the QoS configurator 710 accepts the QoS configuration request of the mobile station, the communication interface 720 sends the QoS configuration response message to the QMA of the mobile station under the control of the controller 700. For example, the communication interface 720 sends the diameter AAR message to the PCRF under the control of the controller 700. The communication interface 720 receives the diameter AAA message from the PCRF.

As such, the mobile station 100 prepares the QoS bearer by directly requesting the QoS of the application to the QMS 120 using the QMA of the QoS configuration module. For example, the mobile station 100 prepares the QoS bearer by requesting the QoS before communicating with the content server 110 or a peer for activating the QoS service. That is, when the application for supporting the QoS service requests the QoS configuration to the QMA, the mobile station 100 prepares the QoS bearer by requesting the QoS to the QMA 120 via the QMA.

For example, to provide a Voice over IP (VoIP) service, the mobile station 100 can prepare the QoS bearer by negotiating with other peer of the communication about a bandwidth and a codec and then requesting the QoS. In so doing, when completing the QoS bearer preparation, the mobile station 100 transmits and receives VoIP traffic through Real-time Transport Protocol (RTP) data traffic using the new QoS bearer.

For example, to provide a Video On Demand (VOD) service; that is, to provide a Real-Time Streaming Protocol (RTSP) service, the mobile station 100 can prepare the QoS bearer by checking video/audio stream information and then requesting the QoS. Upon completing the QoS bearer preparation, the mobile station 100 transmits and receives video/audio traffic through the RTP data traffic using the new QoS bearer.

As set forth above, the mobile station of the wireless communication system requests the QoS per application. Therefore, without the agreement between the communication carrier of the mobile station and the service provider of the application, the QoS service can be provided for the application of the mobile station.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of a mobile station in a wireless communication system, the method comprising:

transmitting, to a first server included in a communication network to which the mobile station is connected, a request message for a quality of service (QoS) configuration regarding an application installed in the mobile station, wherein the request message comprises information regarding the application; and performing a procedure for the QoS configuration with a gateway (GW), wherein the procedure is initiated, by the GW, when a message comprising rule information for the QoS configuration is transmitted from a second server to the GW, wherein the rule information is generated, by the second server, based on the information regarding the application which is transmitted from the first server, and wherein the request message is generated by the application and transmitted from an application layer in which the application is installed to the first server via a middleware (MW).

2. The method of claim 1, wherein the request message further comprises at least one uniform resource locator, a protocol, a URL version, a sequence number, a transmission protocol, and a port address.

3. The method of claim 1, further comprising:
if the application provides a voice over internet protocol (VoIP) service, negotiating with a peer of the wireless communication system about a service bandwidth and a codec.

4. The method of claim 1, wherein the first server is connected to a content server generating the application.

5. The method of claim 1, wherein the second server is a policy and charging enforcement function (PCRF), and
wherein the rule information further comprises policy and charging control (PCC) rule.

6. A method of a first server included in a communication network to which a mobile station is connected, the method comprising:
receiving, from the mobile station, a request message for a quality of service (QoS) configuration regarding an application installed in the mobile station, wherein the request message comprises information regarding the application; and
transmitting, to a second server connected to the first server, the information regarding the application upon determining allowance of the QoS configuration,
wherein the information regarding the application is used, by the second server, for generating rule information for the QoS configuration, and
wherein the rule information is used, by a gateway (GW), for initiating a procedure for the QoS configuration with the mobile station,
wherein the request message is generated by the application and transmitted from an application layer in which the application is installed to the first server via a middleware (MW).

7. The method of claim 6, wherein the request message further comprises at least one uniform resource locator, a protocol, a URL version, a sequence number, a transmission protocol, and a port address.

8. The method of claim 6, wherein the first server is connected to a content server generating the application.

9. The method of claim 6, wherein the second server is a policy and charging enforcement function (PCRF), and
wherein the rule information further comprises policy and charging control (PCC) rule.

10. An apparatus of a mobile station in a wireless communication system, the apparatus comprising:
at least one transceiver; and
at least one processor operatively coupled to the at least one transceiver, wherein the at least one processor is configured to:
transmit, to a first server included in a communication network to which the mobile station is connected, a request message for a quality of service (QoS) configuration regarding an application installed in the mobile station, wherein the request message comprises information regarding the application; and
perform a procedure for the QoS configuration with a gateway (GW), wherein the procedure is initiated, by the GW, when a message comprising rule information for the QoS configuration is transmitted from a second server to the GW,
wherein the rule information is generated, by the second server, based on the information regarding the application which is transmitted from the first server, and
wherein the request message is generated by the application and transmitted from an application layer in which the application is installed to the first server via a middleware (MW).

11. The apparatus of claim 10, wherein the request message further comprises at least one uniform resource locator, a protocol, a URL version, a sequence number, a transmission protocol, and a port address.

12. The apparatus of claim 10, wherein, if the application provides a voice over internet protocol (VoIP) service, the at least one processor is configured to negotiate with a peer of the wireless communication system about a service bandwidth and a codec.

13. The apparatus of claim 10, wherein, if the application provides a video on demand (VOD) service, the at least one processor is configured to check video/audio stream information.

14. The apparatus of claim 10, wherein the second server is a policy and charging enforcement function (PCRF), and
wherein the rule information further comprises policy and charging control (PCC) rule.

15. An apparatus for a first server included in a communication network to which a mobile station is connected, the apparatus comprising:
at least one transceiver; and
at least one processor operatively coupled to the at least one transceiver, wherein the at least one processor is configured to:
receive, from the mobile station, a request message for a quality of service (QoS) configuration regarding an application installed in the mobile station, wherein the request message comprises information regarding the application; and
transmit, to a second server connected to the first server, the information regarding the application upon determining allowance of the QoS configuration,
wherein the information regarding the application is used, by the second server, for generating rule information for the QoS configuration,
wherein the request message is generated by the application and transmitted from an application layer in which the application is installed to the first server via a middleware (MW), and
wherein the rule information is used, by a gateway (GW), for initiating a procedure for the QoS configuration with the mobile station.

16. The apparatus of claim 15, wherein the request message further comprises at least one uniform resource locator, a protocol, a URL version, a sequence number, a transmission protocol, and a port address.

17. The apparatus of claim 15, wherein the first server is connected to a content server generating the application.

18. The apparatus of claim 15, wherein the second server is a policy and charging enforcement function (PCRF), and
wherein the rule information further comprises policy and charging control (PCC) rule.

* * * * *